(12) United States Patent
Sekiya

(10) Patent No.: US 8,462,730 B2
(45) Date of Patent: Jun. 11, 2013

(54) WIRELESS MOBILE STATION, WIRELESS BASE STATION CONTROL DEVICE, WIRELESS SYSTEM AND WIRELESS CELL MANAGEMENT METHOD

(75) Inventor: Kayato Sekiya, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 12/523,851

(22) PCT Filed: Jan. 23, 2008

(86) PCT No.: PCT/JP2008/050872
§ 371 (c)(1),
(2), (4) Date: Jul. 20, 2009

(87) PCT Pub. No.: WO2008/090914
PCT Pub. Date: Jul. 31, 2008

(65) Prior Publication Data
US 2010/0046470 A1 Feb. 25, 2010

(30) Foreign Application Priority Data
Jan. 24, 2007 (JP) ................................. 2007-013850

(51) Int. Cl.
*H04W 4/00* (2009.01)
*H04W 36/00* (2009.01)
(52) U.S. Cl.
USPC .......................................... 370/331; 455/437
(58) Field of Classification Search
None
See application file for complete search history.

(56) References Cited

U.S. PATENT DOCUMENTS

| 6,442,389 | B1 * | 8/2002 | Marcum ........................ 455/437 |
| 2003/0190916 | A1 * | 10/2003 | Celedon et al. ............... 455/437 |
| 2006/0121916 | A1 * | 6/2006 | Aborn et al. ............... 455/456.5 |
| 2008/0002628 | A1 * | 1/2008 | Bi et al. ......................... 370/335 |
| 2008/0025376 | A1 * | 1/2008 | Keel et al. ..................... 375/147 |

FOREIGN PATENT DOCUMENTS

| JP | 2003289562 A | 10/2003 |
| JP | 2003319439 A | 11/2003 |
| JP | 2004501584 A | 1/2004 |
| JP | 2004242139 A | 8/2004 |
| JP | 3734919 B | 10/2005 |
| WO | 03086001 A | 10/2003 |

OTHER PUBLICATIONS

International Search Report for PCT/JP2008/050872 mailed May 1, 2008.

* cited by examiner

*Primary Examiner* — John Blanton

(57) ABSTRACT

A wireless mobile station (1) includes: an acquisition unit (12a) acquiring an adjacent cell list, in a first wireless cell which is a communication area of a wireless base station (2) established a wireless link with the wireless mobile station, defining a second wireless cell adjacent to the first wireless cell; a search unit (13) searching wireless cells which is detectable in the first wireless cell, and measuring a wireless quality sensed by the wireless mobile station from a third wireless cell which is not included in the adjacent cell list among the detected wireless cells; and a determination unit (14) estimating a wireless quality sensed by the wireless mobile station from the third wireless cell on assumption that the third wireless cell is added to the adjacent cell list, and determining whether or not the third wireless cell is to be added to the adjacent cell list by using a result of the estimation.

9 Claims, 10 Drawing Sheets

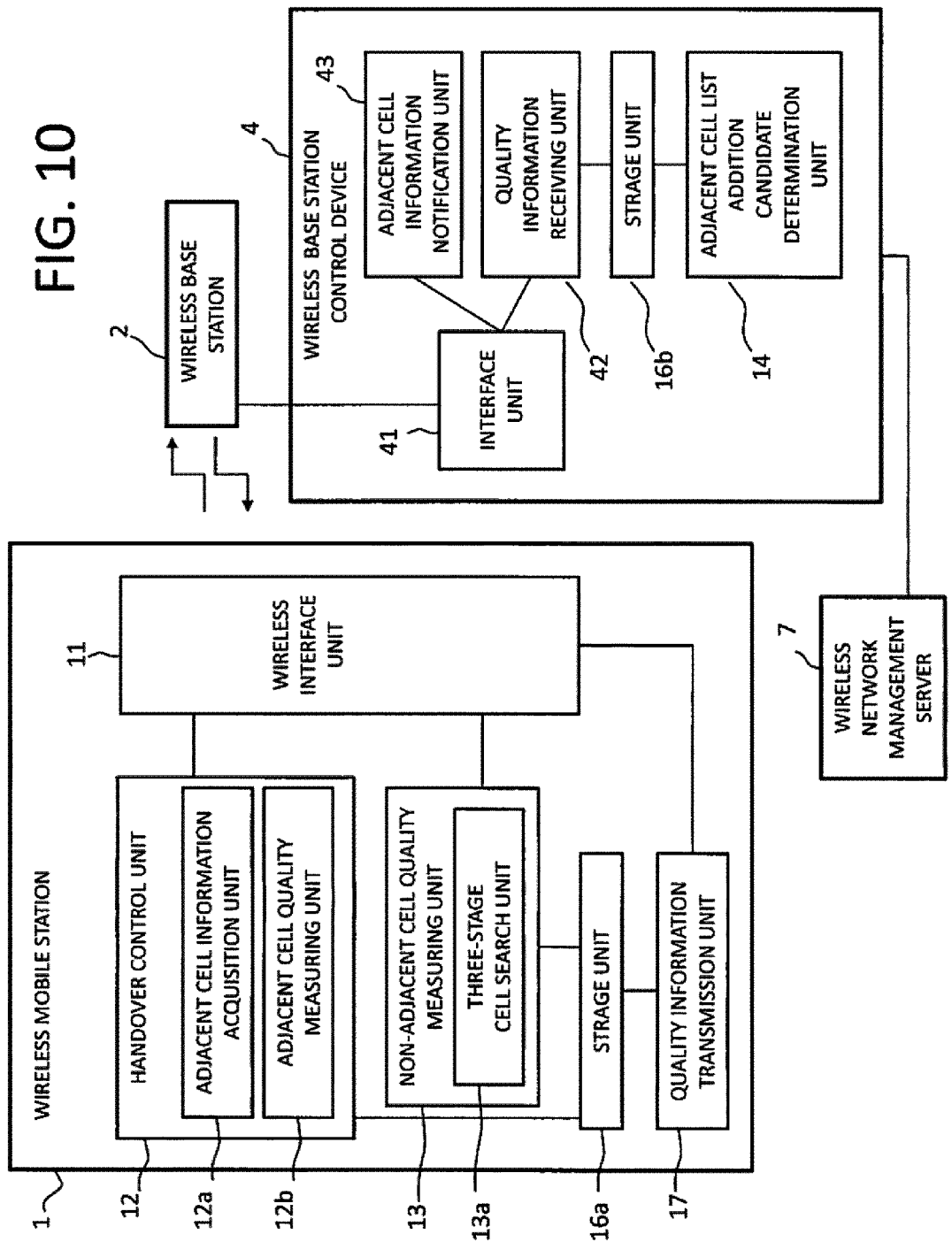

WIRELESS MOBILE STATION, WIRELESS BASE STATION CONTROL DEVICE, WIRELESS SYSTEM AND WIRELESS CELL MANAGEMENT METHOD

This application is the National Phase of PCT/JP2008/050872, filed Jan. 23, 2008, which is based upon and claims priority from Japanese Patent Application No. 2007-013850 filed Jan. 24, 2007.

TECHNICAL FIELD

The present invention relates to a wireless communication technique and particularly relates to a technique for constructing an adjacent cell list that defines wireless cell adjacency relationship.

BACKGROUND ART

In a wireless communication system such as a mobile communication system, a plurality of base station devices each relaying a wireless link to a wired link is disposed. Wireless cells that are areas at which radio waves transmitted from those base station devices arrive are partially overlapped, thereby forming a wide range communication area. Communication services are provided to a mobile station present in the wide range area formed as stated above.

Many mobile communication systems includes a wireless cell switching function called "handover" so as not to break off a communication session even if a mobile station that is holding a communication moves among wireless cells. During the handover, the mobile station maintains the communication by repeatedly releasing a wireless link that is already established and establishing a new wireless link. As one type of the handover, there is known a technique of so-called soft handover used in a W-CDMA (Wideband Code-Division Multiple Access) mobile communication system. This technique is intended to prevent temporary blackout of a communication during handover by establishing the wireless link at the same time by a single wireless mobile station and a plurality of base station.

A base station control device that manages a plurality of base stations determines whether a new wireless link is established and whether an existing wireless link is released during the handover by using a measurement result of wireless qualities notified by the mobile station. A series of process accompanying this determination are roughly as follows.

First, the base station control device compiles a list of wireless cells qualities of which are to be measured by using information on a wireless cell to which the mobile station is connected. The wireless cells listed at this time include the wireless cell to which the mobile station is currently connected and wireless cells adjacent to the current wireless cell. The base station control device creates an adjacent cell list that is a list of listed wireless cells and notifies the mobile station of the adjacent cell list.

Furthermore, at the time of notification of the adjacent cell list, information about conditions for an event notification from the mobile station to the base station control station is also notified. The event notification is made by the mobile station so as to inquire on the base station control device about a final determination when the base station control device determines that it is necessary to release the existing link and to establish a new link as a result of measuring the qualities of the wireless cells. Therefore, notification conditions are prepared for the event notification according to situations such as the establishment or release of the wireless link, respectively. Moreover, the event notification includes a type of an event that occurs (establishment/release of the wireless link or the like) and quality information on surrounding wireless cells at that moment.

The base station control device transmits an instruction to secure or release network resources such as a wired band managed by base stations and to add or release a wireless link for the mobile station by using the event information notified by the mobile station. The mobile station establishes or releases the wireless link according to the instruction from the base station control device. A series of handover process is thereby completed.

A concept called "wireless cell adjacency relationship" plays an important role in the series of process. The wireless cell adjacency relationship means a logical relationship set among a plurality of wireless cells. The base station control device selects a wireless cell to which a new wireless link is to be established among the other wireless cells having the adjacency relationship with the wireless cell to which the wireless link is currently established. The mobile station cannot hand over the wireless link to a wireless cell that does not have the adjacency relationship with the wireless cell to which the link is established.

Generally, an administrator of a mobile communication system manually creates and manages a list relating to the wireless cell adjacency relationship as the adjacent cell list. If lack of registration occurs in the adjacent cell list, the mobile station that is holding a communication cannot execute handover, possibly resulting in break-off of a communication session or degradation of a communication quality. Such circumstances greatly disturb user-friendliness and possibly produce dissatisfaction of a user and discontinuation of a service agreement. It is, therefore, an important task for a common carrier to create and manage an accurate adjacent cell list.

Examples of a typical method of creating and managing the adjacent cell list include a method of measuring wireless qualities of wireless cells within a service area by a motor vehicle mounting a measuring tool and creating an adjacent cell list based on a wireless cell overlap situation. With this method, however, it is necessary to regularly drive the motor vehicle within the service area so as to follow up a change in the wireless cell overlap situation according to a change in a propagation environment or in a service utilization situation. This imposes heavier burden on the common carrier as the mobile communication system has become popular and the number of wireless base stations increases.

As a technique for dealing with the above-stated problems, there is known, for example, a technique described in Patent Literature 1 to be described later. The technique of the Patent Literature 1 is to measure time when a mobile station is connected to each base station, notifies a base station control device of base stations for which connection time is short and to skip handover to the base stations. By doing so, base stations that possibly cause frequent handover are deleted from an adjacent cell list.

{Citation List}
{Patent Literature}
{PL 1} Japanese Patent Application Laid-Open No. 2003-289562 (FIG. 3).

SUMMARY OF INVENTION

Technical Problem

However, according to the technique described in the Patent Literature 1, unnecessary base stations can be deleted from the adjacent cell list but lack of registration in the adjacent cell list cannot be detected. As a result, according to the technique described in the Patent Literature 1, it is difficult to avoid breaking off a communication session to follow the lack of registration in the adjacent cell list and degrading a communication quality.

This problem will be described more specifically while taking handover in a W-CDMA mobile communication system as an example. When a mobile station starts a communication, a base station control device transmits information on cells the qualities of which are to be monitored and conditions for an event notification to the mobile station using a Measurement Control message according to an RRC (Radio Resource Control) protocol. The quality monitoring target cells refer to a wireless cell to which the mobile station currently establishes a wireless link and adjacent cells to the current wireless cell.

The mobile station makes an event notification to the base station control device using a Measurement Report when the wireless qualities of the adjacent cells satisfy specific conditions with respect to the wireless quality of the wireless cell to which the mobile station currently establishes the wireless link. For example, if the wireless qualities of the adjacent cells measured by the mobile station are already close to a wireless quality of the wireless cell to which the wireless link is already established and exceed a predetermined value, the mobile station notifies the base station control device of an event called "event 1a". As for the wireless quality, an Ec/N0 (a ratio of energy per chip to background noise power spectrum density) in a CPICH (Common Pilot Channel) is normally monitored.

The base station control device secures network resources such as a wired band according to event information transmitted from the mobile station. Furthermore, the base station control device transmits a wireless link addition instruction to the mobile station using an Active Set Update message. The mobile station establishes a wireless link to a new base station according to this message.

However, if the new base station is not registered in the adjacent cell list, the quality target cells in the Measurement Control transmitted from the base station control device do not include the unregistered base station. Due to this, the mobile station does not notify this unregistered base station of the event. In this case, the mobile station cannot move to a new wireless cell, that is, cannot execute handover, resulting in disconnection of a communication.

These circumstances simply appear to the base station control device that the mobile station has moved to an area (a blind zone) at which radio waves from base stations cannot arrive. It is, therefore, difficult for the administrator of the base station control device to grasp that disconnection of the communication occurs due to lack of registration in the adjacent cell list and to grasp information such as which wireless cell is unregistered in the list.

The present invention has been achieved in light of the above-stated problems. It is an object of the present invention to provide a technique for efficiently detecting lack of registration in an adjacent cell list.

Solution to Problem

A wireless mobile station according to the present invention includes: an acquisition unit acquiring an adjacent cell list, in a first wireless cell which is a communication area of a wireless base station established a wireless link with the wireless mobile station, defining a second wireless cell adjacent to the first wireless cell; a search unit searching wireless cells which is detectable in the first wireless cell, and measuring a wireless quality sensed by the wireless mobile station from a third wireless cell which is not included in the adjacent cell list among the detected wireless cells; and a determination unit estimating a wireless quality sensed by the wireless mobile station from the third wireless cell on assumption that the third wireless cell is added to the adjacent cell list, and determining whether or not the third wireless cell is to be added to the adjacent cell list by using a result of the estimation.

A wireless system according to the present invention includes: a wireless mobile station including an acquisition unit acquiring an adjacent cell list, in a first wireless cell which is a communication area of a wireless base station established a wireless link with the wireless mobile station, defining a second wireless cell adjacent to the first wireless cell; a measuring unit measuring wireless qualities sensed by the wireless mobile station from the first wireless cell and the second wireless cell; a search unit searching wireless cells which is detectable in the first wireless cell, and measuring a wireless quality sensed by the wireless mobile station from a third wireless cell which is not included in the adjacent cell list among the detected wireless cells; and a transmission unit transmitting the measured wireless qualities of the respective wireless cells; and a wireless base station control device including a notification unit notifying a wireless mobile station which establishes a wireless link with a wireless base station of an adjacent cell list defining a second wireless cell adjacent to a first wireless cell which is a communication area of the wireless base station; a receiving unit receiving information on a wireless quality, from the wireless mobile station, measured by the wireless mobile station about a third wireless cell which is not included in the adjacent cell list; and a determination unit estimating a wireless quality sensed by the wireless mobile station from the third wireless cell on assumption that the third wireless cell is added to the adjacent cell list, and determining whether or not the third wireless cell is to be added to the adjacent cell list by using a result of the estimation.

Advantageous Effects of Invention

According to the present invention, a system administrator can grasp whether or not lack of registration occurs in an adjacent cell list without conducting a driving test of a motor vehicle mounting a special measuring tool. It is thereby possible to promptly deal with disconnection of a communication and degradation in a communication quality resulting from the lack of registration in the adjacent cell list and to eventually improve a quality of a wireless network.

BRIEF DESCRIPTION OF DRAWINGS

{FIG. 10} A block diagram shows configurations of a wireless mobile station and a wireless base station control device according to another embodiment of the present invention.

Figure 1:
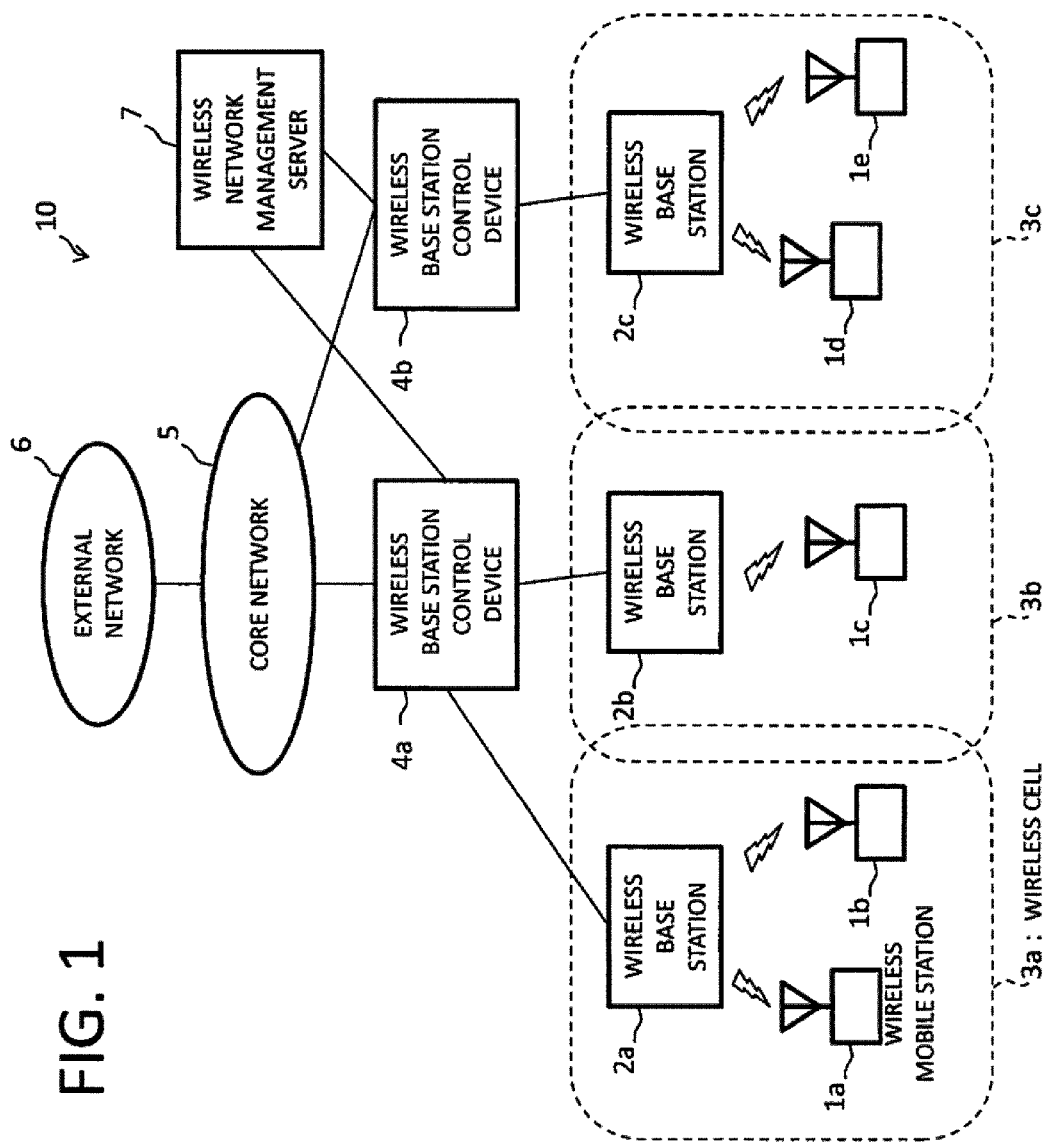
{FIG. 1} A block diagram shows a configuration of a system according to an embodiment of the present invention.

REFERENCE SIGNS LIST 1, 1a, 1b, 1c, 1d, 1e Wireless mobile station
2, 2a, 2b, 2c Wireless base station
3a, 3b, 3c Wireless cell
4, 4a, 4b Wireless base station control device
5 Core network
6 External network
7 Wireless network management server
11 Wireless interface unit
12 Handover control unit
12a Adjacent cell information acquisition unit
12b Adjacent cell quality measuring unit
13 Non-adjacent cell quality measuring unit
13a Three-stage cell search unit
14 Adjacent cell list addition candidate determination unit
15 Adjacent cell list addition candidate transmission unit
16, 16a, 16b Storage unit
17 Quality information transmission unit
41 Interface unit
42 Quality information receiving unit
43 Adjacent cell information notification unit

DESCRIPTION OF EMBODIMENTS

Embodiments of the present invention will be described in detail with reference to the drawings. FIG. 1 shows a configuration of a wireless network system 10 according to an embodiment of the present invention. The wireless network system 10 is configured to include wireless base stations 2 (2a/2b/2c) forming wireless cells 3 (3a/3b/3c) by transmitting wireless signals, wireless mobile stations 1 (1a/1b/1c/1d/1e) belonging to these one or more wireless cells and communicating with the wireless cells via the wireless base stations 2, wireless base station control devices 4 (4a/4b) exercising various controls over the wireless base stations 2 and the wireless mobile stations 1, and a core network 5 that arbitrates between each of the wireless base stations 2 and an external network 6 in a communication.

The wireless network system 10 also includes a wireless network management server 7 connected to the wireless base station control devices 4 with views of monitoring a wireless network.

Figure 2:
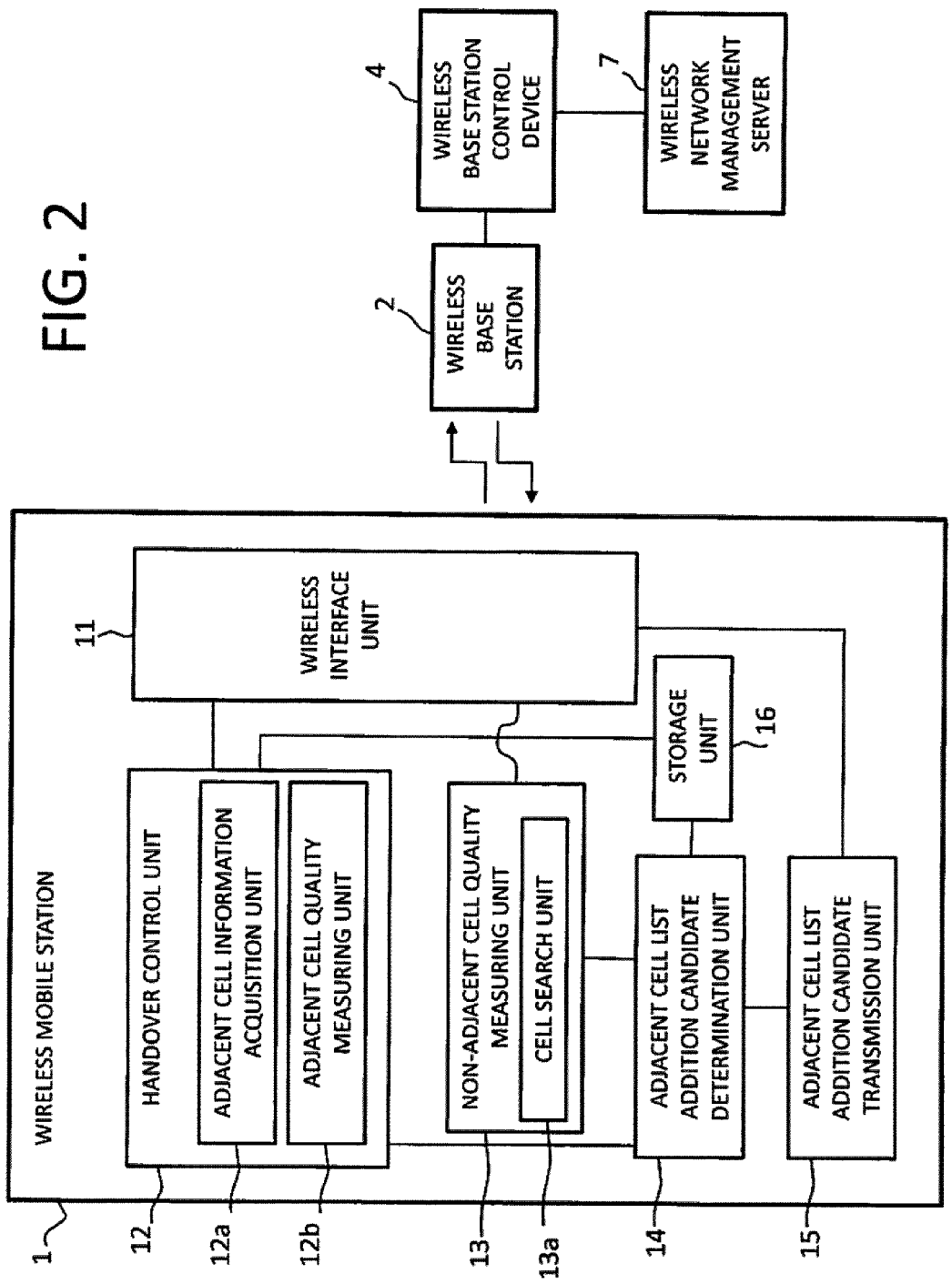
{FIG. 2} A block diagram shows a configuration of a wireless mobile station according to the embodiment.

FIG. 2 shows constituent elements of wireless mobile station 1. A bidirectional wireless link is established between the wireless base stations 2 and the wireless mobile station 1 owned by a user, and a communication between the wireless base station 2 and the wireless mobile station 1 is held via this wireless link. The wireless mobile station 1 includes a wireless interface unit 11, a handover control unit 12, a non-adjacent cell quality measuring unit 13, an adjacent cell list addition candidate determination unit 14 and an adjacent cell list addition candidate transmission unit 15.

The wireless interface unit 11 transmits or receives communication traffic information and wireless network control information to or from the wireless base station 2.

The handover control unit 12 measures wireless qualities of wireless cells communication qualities of which are to be monitored, that is, a wireless cell to which the wireless mobile station 1 is currently connected and wireless cells adjacent to the current wireless cell by using information notified by the wireless base station control device 4. Furthermore, the handover control unit 12 includes such functions as a function of making an event notification to the wireless base station control device 4 according to a measurement result of the handover control unit 12 and a function of establishing or releasing a wireless link according to an instruction of the wireless base station control device 4. The handover control unit 12 includes an adjacent cell information acquisition unit 12a receiving adjacent cell information from the wireless base station control unit 4 and an adjacent cell quality measuring unit 12b measuring the qualities of the adjacent cells.

The non-adjacent cell quality measuring unit 13, which corresponds to a search unit according to the present invention, detects wireless cells other than the adjacent cells and measures qualities of the detected wireless cells. To detect the wireless cell according to this embodiment, a cell search unit 13a uses a conventionally known technique referred to as "three-stage cell search". The three-stage cell search is a process for searching wireless cells that a mobile station can currently detect. Generally, the three-stage cell search is implemented by a mobile station establishing an initial connection with a wireless base station when, for example, the mobile station is turned on. In the three-stage cell search in a W-CDMA wireless system, all spreading codes are to be searched.

The adjacent cell list addition candidate determination unit 14 determines a wireless cell candidate to be added as an adjacent cell in the future by using the wireless qualities of the quality monitoring target cells measured by the handover control unit 12 and those of the wireless cells other than the adjacent cells measured by the non-adjacent cell quality measuring unit 13.

The most adjacent cell list addition candidate transmission unit 15 transmits wireless cell information on addition candidates created by the adjacent cell list addition candidate determination unit 14 to the wireless network management server 7 via the wireless interface unit 11.

The storage unit 16 is a storage device that temporarily stores quality information on the wireless cells measured by the handover control unit 12 and the non-adjacent cell quality measurement unit 13 in a specific time range.

It is to be noted that functions other than those stated above with respect to the wireless mobile station 1, the wireless base station 2, the base station control device 4, the core network 5 and the external network 6 are well known to a person ordinary skill in the art and are not, therefore, described in detail.

Figure 3:
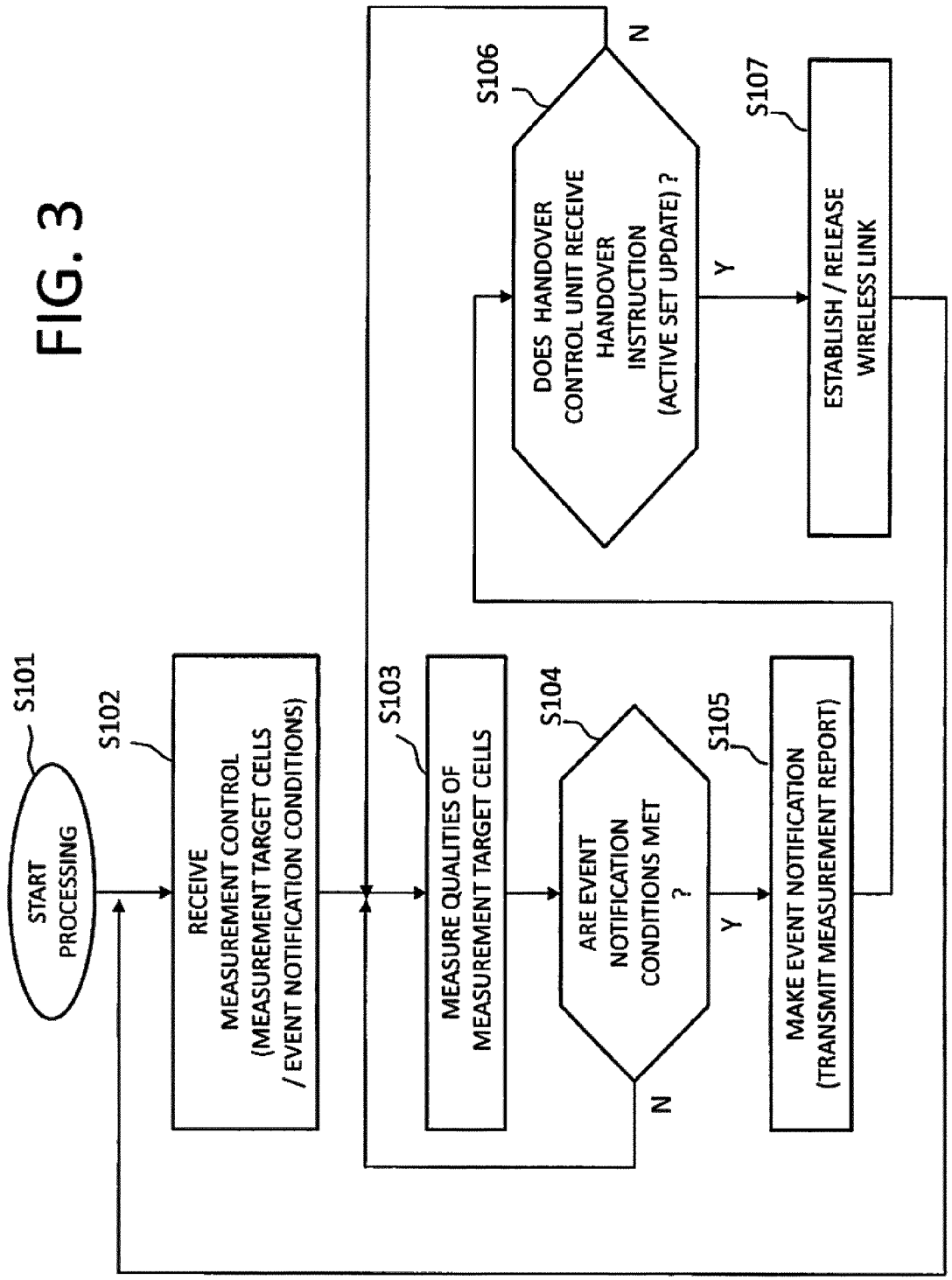
{FIG. 3} A flowchart shows an operation performed by a handover control unit according to the embodiment.
Figure 4:
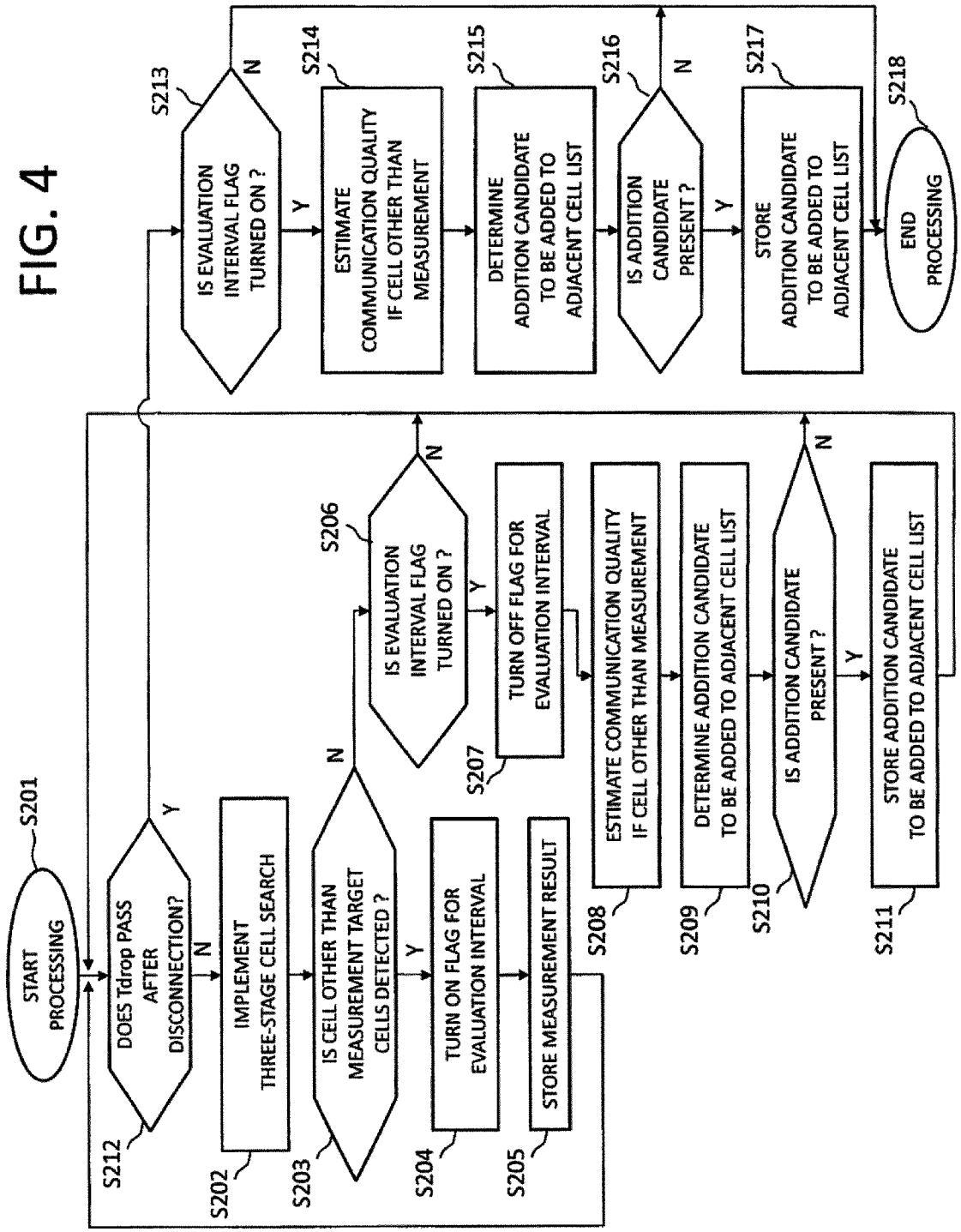
{FIG. 4} A flowchart shows operations performed by a non-adjacent cell quality measuring unit and an adjacent cell list addition candidate determination unit according to the embodiment.

Referring to flowcharts of FIGS. 3 and 4, an operation performed by the wireless mobile station 1 shown in FIG. 2 will be described. FIG. 3 represents a process performed by the handover control unit 12 and FIG. 4 represents process performed by the non-adjacent cell quality measuring unit 13 and the adjacent cell list addition candidate determination unit 14. Furthermore, FIGS. 5, 6, 7 and 8 show an example of transition of radio qualities of the wireless cells measured by the handover control unit 12 and the non-adjacent cell quality measuring unit 13 or, to be specific, an example of temporal transition of Ec/N0.

Using FIGS. 3 and 5, the process performed by the handover control unit 12 will be described. Although this process is basically similar to a handover process performed in a conventional mobile communication system, the process will be described because it is relevant to this embodiment.

When a communication session is established by, for example, start of a telephone call, the adjacent cell information acquisition unit 12a of the handover control unit 12 starts a process (step S101) and receives a Measurement Control message from the wireless base station control unit 4 (step S102). This Measurement Control message describes information on wireless cells communication qualities of which are to be measured ("measurement target cells") and event notification conditions.

Figure 5:
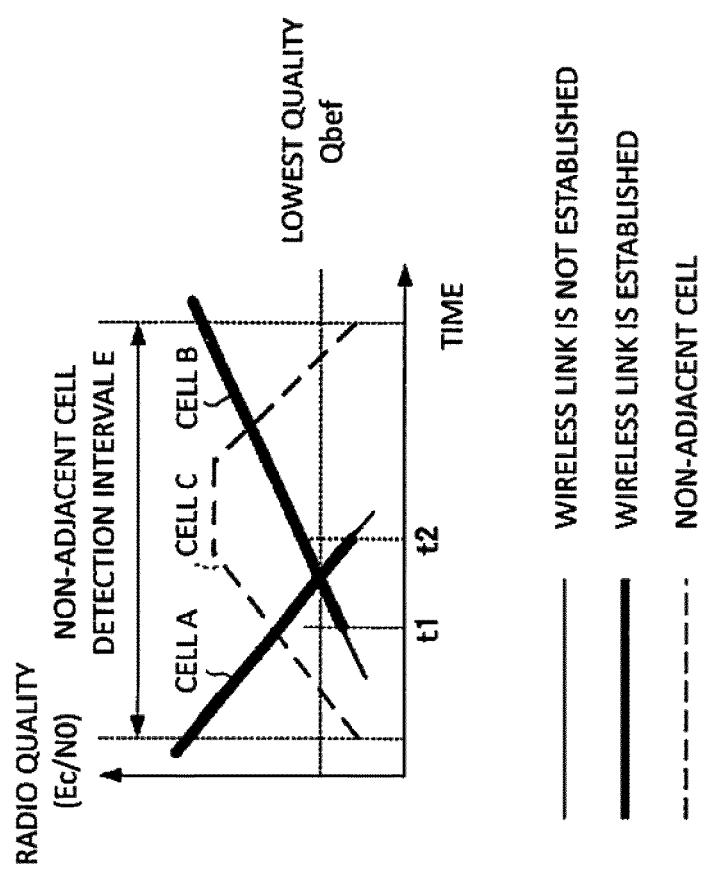
{FIG. 5} An explanatory diagram relates to a measurement result of wireless qualities according to the embodiment.

In a case shown in FIG. 5, the wireless mobile station 1 is assumed to be connected to a cell A at start of the telephone call. It is also assumed that a cell B is set as an adjacent cell to the cell A and that a cell C is not set as an adjacent cell to the cell A. That is, in case of this example, the measurement target cells for the wireless mobile station 1 are the cells A and B. Therefore, the adjacent cell quality measuring unit 13 measures wireless qualities of the cells A and B (step S103). In this case, the cell A that is currently connected to the wireless mobile station 1 corresponds to a first wireless cell according to the present invention, the cell B that is the adjacent cell corresponds to a second wireless cell and the cell C that is unregistered in an adjacent cell list corresponds to a third wireless cell.

It is now assumed that the event notification conditions (new wireless link establishment conditions) are met at time t1 shown in FIG. 5 since the quality of the cell B is close to that of the cell A (step S104: Yes). Examples of specific conditions include a condition that the quality of the adjacent cell (cell B) is close to that of the cell to which the wireless mobile station 1 already establishes a wireless link (cell A) to be equal to or less than 3 dB and that one second passes since a state that the quality of the adjacent cell (cell B) is close to that of the cell A.

When the conditions are met (FIG. 5: t1), the handover control unit 12 transmits a Measurement Report that is an event notification for requesting addition of a wireless link to the wireless base station control device 4 (step S105). Thereafter, when the handover control unit 12 receives an Active Set Update representing an handover instruction from the wireless base station control device 4 at time t2 shown in FIG. 5 (step S106: Yes), the handover control unit 12 releases the wireless link used so far (to the cell A) and establishes a new wireless link (to the cell B) (step S107). A series of handover process is thereby completed.

In this way, the wireless mobile station 1 repeatedly releases an existing wireless link and establishes a new wireless link, thereby maintaining the communication even during the handover. If wireless links are established for a single wireless mobile station via a plurality of wireless base stations 2, the wireless base station control unit 4 selects the wireless link having a higher quality by a conventionally known technique referred to as "macrodiversity".

According to FIG. 5, a quality value Qbef at an intersection between a graph of the cell A showing falling quality and a graph of the cell B showing rising quality is defined as a lowest quality value sensed by the wireless mobile station 1 from the cell B which is a destination of the handover.

Using the flowchart of FIG. 4 and FIGS. 5 and 6, process performed by the non-adjacent cell quality measuring unit 13 and the adjacent cell list addition candidate determination unit 14 will be described. When the communication session is established, the non-adjacent cell quality measuring unit 13 starts a process (step S201) and recognizes an adjacent cell list included in the Measurement Control message transmitted from the wireless base station control device 4. Furthermore, the non-adjacent cell quality measuring unit 13 detects and measures a quality of a wireless cell that is not designated as a measurement target cell in the adjacent cell list, that is, a non-adjacent cell concurrently to measurement of wireless qualities of cells in the adjacent cell list by the handover control unit 12 stated above (FIG. 3: step S103).

To detect the non-adjacent cell, the non-adjacent cell quality measuring unit 13 implements a cell search on all the wireless cells by the above-stated three-stage cell search by the cell search unit 13a (step S202), thereby determining whether or not the non-adjacent cell is present (step S203). The non-adjacent cell quality measuring unit 13 can determine whether or not non-adjacent cell is present by excluding the wireless cells in the adjacent list from the detected wireless cells. The non-adjacent cell quality measuring unit 13 measures a wireless quality of the non-adjacent cell if the non-adjacent cell is detected.

When measuring the wireless quality of the non-adjacent cell, the non-adjacent cell quality measuring unit 13 defines a time range as one evaluation interval in which the non-adjacent cell quality measuring unit 13 can seamlessly sense the non-adjacent cell. For this definition, the non-adjacent cell quality measuring unit 13 sets a flag for managing the evaluation interval to be turned on when the non-adjacent cell quality measuring unit 13 can sense the non-adjacent cell with a preset quality (step S204). Thereafter, when the non-adjacent cell quality measuring unit 13 cannot sense the non-adjacent cell appropriately, the non-adjacent cell quality measuring unit 13 sets the flag to be turned off (step S207). Thereby, a start and an end of the evaluation interval are defined. The non-adjacent cell quality measuring unit 13 temporarily stores a measurement result of the quality of the non-adjacent cell in the evaluation interval in the storage unit 16 (step S205).

The adjacent cell list addition candidate determination unit 14 determines whether or not the non-adjacent cell (FIG. 5: cell C) is to be added to the adjacent cell list when the evaluation interval (FIG. 5: interval E) is detected. For this determination, when the end of the evaluation interval is detected (step S207), the adjacent cell list addition candidate determination unit 14 reads the measurement result of the quality of the non-adjacent cell (cell C) in the evaluation interval from the storage unit 16. Using the read data, the adjacent cell list addition candidate determination unit 14 estimates a wireless quality on assumption that the non-adjacent cell is adopted as a new adjacent cell (step S208). The adjacent cell list addition candidate determination unit 14 makes this estimation by virtually adding the non-adjacent cell to the current adjacent cell list.

Figure 6:
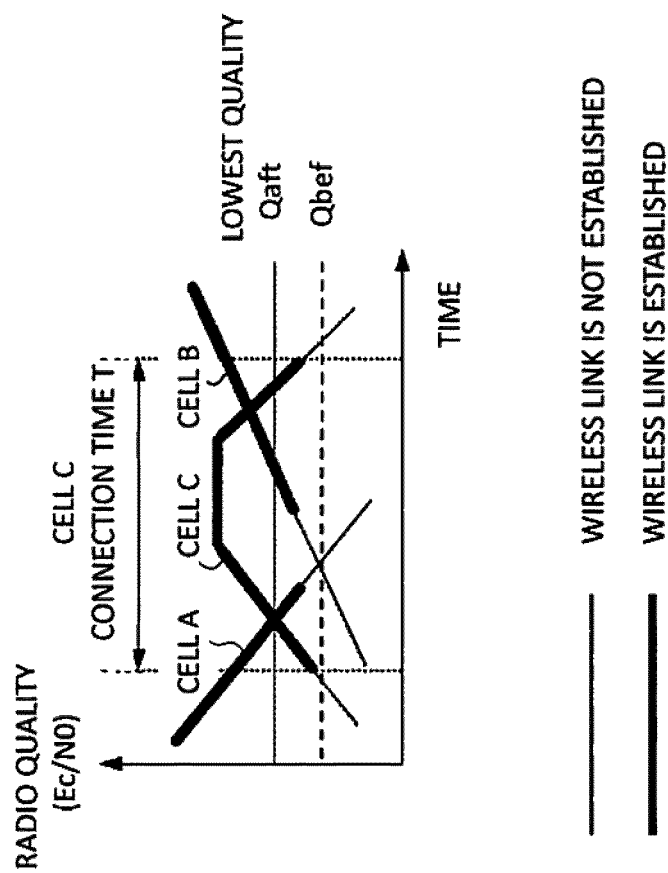
{FIG. 6} An explanatory diagram relates to an estimation result of wireless qualities according to the embodiment.

FIG. 6 shows a result of virtually adding the cell C to the list as an adjacent cell to the cell A. It is assumed herein that the same event notification conditions as those before addition to the list are notified by the Measurement Control message from the wireless base station control device 4 also after the cell C is added to the adjacent cell list. It is also assumed that the wireless base station control device 4 always transmits the Active Set Update to the wireless mobile station 1 as a response to the Measurement Report that is the event notification from the wireless mobile station 1 to the wireless base station control device 4.

As shown in FIG. 6, if the cell C is added to the adjacent cell list, it is estimated that the lowest quality value sensed by the wireless base station 1 moves from Qbef before addition (FIG. 5) to a value Qaft at an intersection between graphs of the cells A and C. If a plurality of non-adjacent cells is detected in one evaluation interval, the adjacent cell list addition candidate determination unit 14 may estimate the communication quality if an arbitrary combination of non-adjacent cells is added to the adjacent cell list.

Moreover, the adjacent cell list addition candidate determination unit 14 estimates a wireless link duration for the non-adjacent cell assumed to be added to the adjacent cell list. For example, in an example shown in FIG. 6, the adjacent cell list addition candidate determination unit 14 estimates that the wireless link to the wireless mobile station 1 in the cell C that is the non-adjacent cell continues for a period of time T. As shown in FIG. 6, this period T refers to a period since the quality of the cell C rises and reaches the lowest quality Qbef until the quality of this cell C then falls and reaches the same lowest quality Qbef.

Next, the adjacent cell list addition candidate determination unit 14 determines a cell (an addition candidate) to be actually added to the adjacent cell list among the non-adjacent cells (step S209). The adjacent cell list addition candidate determination unit 14 can made this determination using a result of estimation of the lowest quality (Qaft) if the non-adjacent cell is added to the adjacent cell list and the period T (FIG. 6) estimated in a manner stated above.

As a specific determination method, if, for example, one of the lowest quality value Qaft and the estimated connection time T exceeds a predetermined threshold value or both of these (Qaft and T) exceed threshold values, respectively, the adjacent cell list addition candidate determination unit 14 decides to add the non-adjacent cell to the adjacent cell list.

Figure 9:
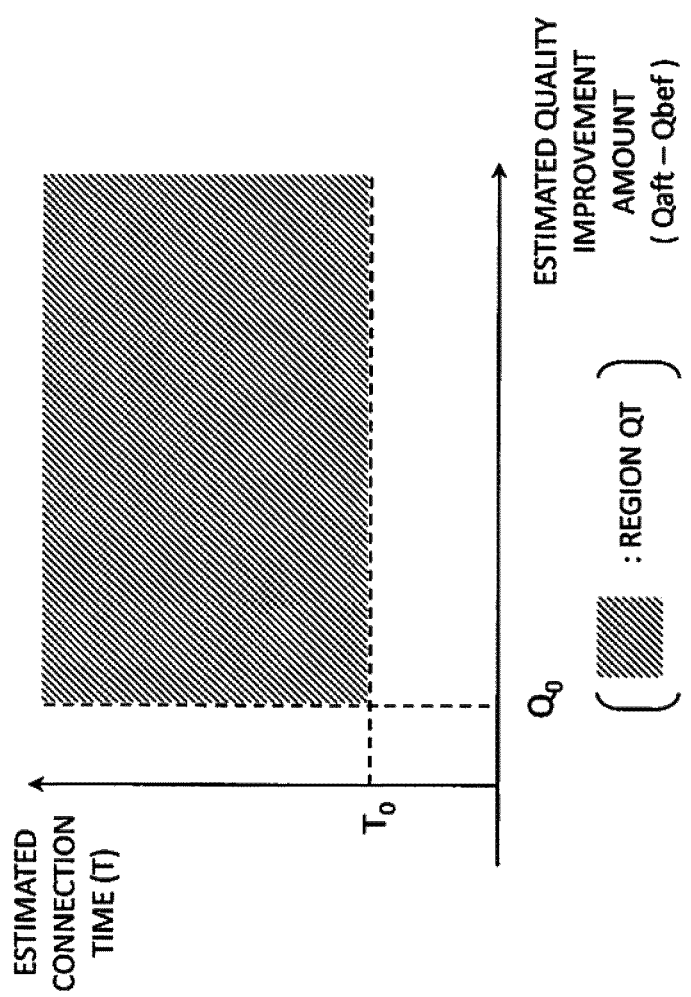
{FIG. 9} An explanatory diagram relates to determination conditions for addition candidates to be added to an adjacent cell list according to the embodiment.

Moreover, as another determination method, there is known a method using determination conditions using the lowest quality (Qbef) before the non-adjacent cell is added to the adjacent cell list. FIG. 9 shows the determination conditions.

A horizontal axis of a graph shown in FIG. 9 is an axis of an estimated quality improvement amount accompanying addition to the adjacent cell list. This estimated quality improvement amount is obtained by subtracting the lowest quality (Qbef) before adding the non-adjacent cell to the list from the lowest quality (Qaft) if the non-adjacent cell is added to the adjacent cell list. Further, a vertical axis of the graph is the estimated connection time T. If the determination target non-adjacent cell meets the conditions represented by a region QT shown in FIG. 9, that is, if the quality improvement amount is equal to or greater than a predetermined value Q0 and the estimated connection time is equal to or longer than a predetermined value T0, the adjacent cell list addition candidate determination unit 14 decides to add the adjacent cell to the adjacent cell list.

In this way, by combining the quality improvement amount (Qaft-Qbef) and the estimated connection time (T) as conditions for adding to the adjacent cell list, a non-adjacent cell that can continue connection for a long period to a certain extent at a higher quality can be added to the adjacent cell list. As a result, it is possible to avoid that the wireless base station control device 4 turns into an overloaded state by frequent occurrence of the establishment and the release of the wireless link for short time.

As an addition candidate determination method for adding to the adjacent cell list, a method including converting the estimated connection time into an estimated movement distance by using a measurement result obtained by a GPS (Global Positioning System), an acceleration sensor, a geomagnetic sensor or the like and determining whether or not a non-adjacent cell is to be added to the adjacent cell list according to the distance may be adopted.

If the non-adjacent cell to be added to the adjacent cell list is present as a result of the determination (step S210: Yes), the adjacent cell list addition candidate determination unit 14 stores information on the non-adjacent cell in the storage unit 16 (step S211). The adjacent cell list addition candidate transmission unit 15 reads the addition candidate to be added to the adjacent cell list from the storage unit 16 at appropriate time that does not influence user's communication and transmits the addition candidate to the wireless network management server 7.

Next, referring to FIG. 7, a case in which the wireless quality degrades and the communication session is broken off to follow lack of registration in the adjacent cell list will be described. It is assumed in this case that the wireless mobile station 1 establishes the wireless link with the wireless cell A according to FIG. 7. It is also assumed that a cell D is a cell actually adjacent to the cell A but is not registered in the adjacent cell list, that is, an erroneously unregistered cell.

The erroneously unregistered cell such as the cell D is not included in the measurement targets in the Measurement Control message from the wireless base station control device 4. Due to this, even if the wireless quality of the cell A sensed by the wireless mobile station 1 continuously degrades, the wireless mobile station 1 does not make an event notification to the wireless base station control device 4. As a result, when the quality of the wireless link of the cell A degrades to Qbef2 at time t3, the wireless mobile station 1 is made asynchronous with the wireless base station 2 in the cell A, thereby disconnecting the communication session. Process performed by the non-adjacent cell quality measuring unit 13 and the adjacent cell list addition candidate determination unit 14 in these situations will be described with reference to the flowchart of FIG. 4.

Figure 7:
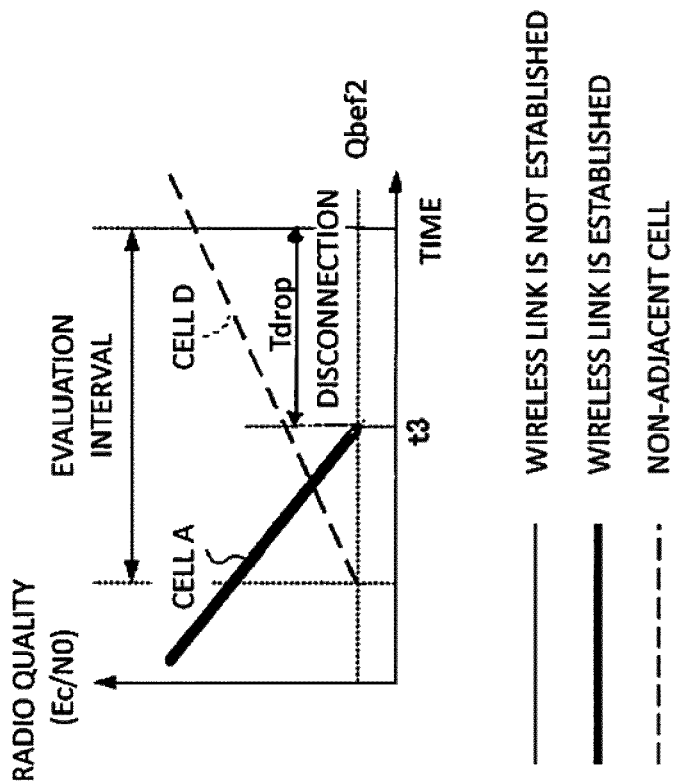
{FIG. 7} An explanatory diagram relates to a measurement result of wireless qualities according to the embodiment.

When the quality of the cell A reaches a lowest level (Qbef2) to thereby disconnect the communication at the time t3 shown in FIG. 7, the non-adjacent cell quality measuring unit 13 continues a quality measurement by the three-stage cell search before time Tdrop passes (step S212: No) (step S202). Further, if the evaluation interval flag is "ON" (step S213: Yes), that is, some non-adjacent cell is detected by the three-stage cell search when the time Tdrop passes (step S212: Yes), the process goes to a process for determining whether or not the non-adjacent cell is an addition candidate to be added to the adjacent cell list.

As shown in FIG. 7, the determination evaluation interval is assumed from time the non-adjacent cell (cell D) is detected until the time Tdrop passes after disconnection of the communication. Similarly to the process in the step S208, the adjacent cell list addition candidate determination unit 14 estimates the communication quality if the non-adjacent cell is added to the adjacent cell list using the quality measurement result read from the storage unit 16 with respect to the evaluation interval (step S214).

Figure 8:
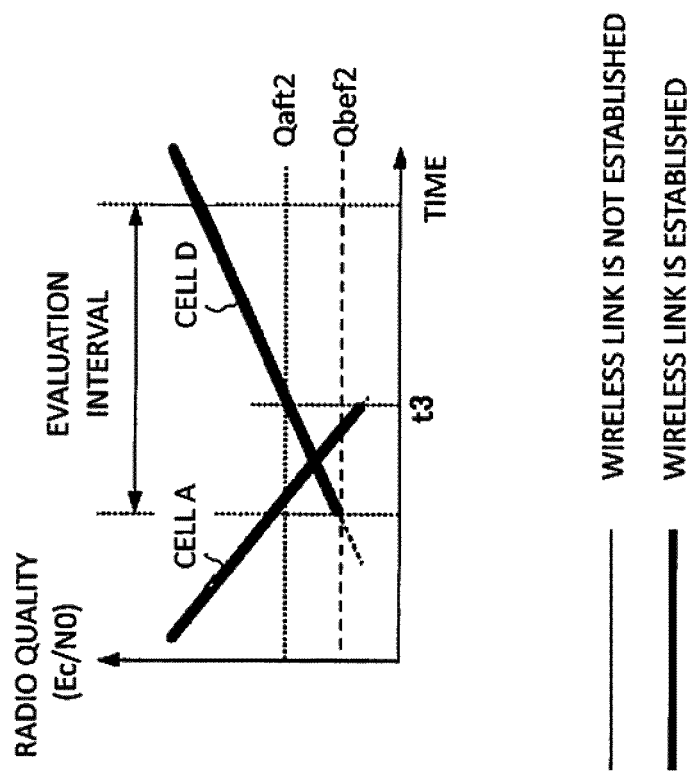
{FIG. 8} An explanatory diagram relates to an estimation result of wireless qualities according to the embodiment.

FIG. 8 shows a result of the estimation. If the cell D is added to the adjacent cell list, it is estimated that the communication continues by handover to the cell D even if the communication in the cell A is disconnected at the time t3 as shown in FIG. 8. Moreover, as a result, it is estimated that the lowest quality sensed by the wireless mobile station 1 becomes Qaft2.

Next, the adjacent cell list addition candidate determination unit 14 determines a candidate actually added to the adjacent cell list among the non-adjacent cells (step S215). The adjacent cell list addition candidate determination unit 14 makes this determination using the quality measurement result (Qbef2) at the disconnection time t3 and the quality estimation result (Qaft2) if the non-adjacent cell is added to the adjacent cell list. Specifically, if a condition is met that Qaft2 is equal to or higher than Qbef2, the adjacent cell list addition candidate determination unit 14 determines that the target non-adjacent cell is a candidate to be added to the adjacent cell list. In an example shown in FIG. 8, since Qaft2 is equal to or higher than Qbef2, the adjacent cell list addition candidate determination unit 14 determines that the cell D is to be added to the adjacent cell list.

If a candidate to be added to the adjacent cell list is present as a result of the determination (step S216: Yes), the adjacent cell list addition candidate determination unit 14 stores information on the wireless cell in the storage unit 16 (step S217). The adjacent cell list addition candidate transmission unit 15 transmits the stored information to the wireless network management server 7 at timing that hardly influences the user's communication.

In this way, the wireless mobile station 1 according to this embodiment searches a non-adjacent cell that is not included in the adjacent cell list by the three-stage cell search in the wireless cell in which the wireless mobile station 1 currently holds a communication. If the non-adjacent cell is detected, the wireless quality if the non-adjacent cell is added to the adjacent cell list is estimated. Using the result of the estimation, the wireless mobile station 1 determines whether or not the non-adjacent cell is to be added to the adjacent cell list and notifies the result of the determination to the wireless network management server 7.

Therefore, according to this embodiment, a system administrator can grasp whether or not lack of registration occurs in the adjacent cell list without conducting a driving test on a motor vehicle mounting a special measuring tool or the like. It is thereby possible to promptly deal with disconnection of a communication or degradation of a communication quality resulting from the lack of registration in the adjacent cell list and to eventually improve the quality of the wireless network.

FIG. 10 shows a configuration of another embodiment of the present invention. This embodiment is configured so that an adjacent cell list addition candidate determination unit 14, which is provided in the wireless mobile station 1 according to the preceding embodiment shown in FIG. 2, is arranged in a wireless base station control device 4 in place of a wireless mobile station 1.

As shown in FIG. 10, the wireless mobile station 1 according to this embodiment includes a quality information transmission unit 17 in place of the adjacent cell list addition candidate determination unit 14 and the adjacent cell list addition candidate transmission unit 15 shown in FIG. 2. Furthermore, the wireless base station control device 4 includes a storage unit 16b, an interface unit 41, a quality information receiving unit 42 and an adjacent cell information notification unit 43 as well as the adjacent cell list addition candidate determination unit 14.

The quality information transmission unit 17 of the wireless mobile station 1 transmits a result of a quality measurement made by a handover control unit 12 and a non-adjacent cell quality measuring unit 13 and stored in a storage unit 16a to the wireless base station control device 4 for every evaluation interval shown in FIGS. 5 to 8.

The interface unit 41 of the wireless base station control device 4 is connected to the wireless mobile station 1 via a wireless base station 2, thereby providing a logic communication path between the wireless base station 2 and the wireless mobile station 1. The quality information receiving unit 42 receives the result of the quality measurement supplied from the wireless mobile station 1 and stores the result of the quality measurement in the storage unit 16b. The adjacent cell list addition candidate determination unit 14 fetches the result of the quality measurement stored in the storage unit 16b and determines whether or not a non-adjacent cell is an addition candidate to be added to an adjacent cell list. The adjacent cell information notification unit 43 notifies the wireless mobile station 1 of a quality measurement target cell and event notification conditions.

In this way, according to this embodiment, information on a communication quality of the non-adjacent cell measured by the wireless mobile station 1 is transferred from the wireless mobile station to the wireless base station control device 4 via the wireless base station 2. Furthermore, the wireless base station control device 4 decides an addition candidate to be added to the adjacent cell list by using the transferred information. Since the other process are similar to those according to the preceding embodiment described with reference to FIGS. 3 and 4, they will not be described herein.

According to this embodiment, the adjacent cell list addition candidate determination unit 14 is arranged in the wireless base station control device 4, whereby a process burden on the wireless mobile station 1 can be lessened.

As method of detecting the third wireless cell according to the present invention, that is, the wireless cell that is not registered in the adjacent cell list, the three-stage cell search method (13a) is used in the embodiment. Although it is known that the wireless cell can be searched relatively efficiently by using this three-stage cell search, the method of detecting the third wireless cell is not limited to the three-stage cell search and the third wireless cell may be searched by another technique.

A wireless communication according to the present invention is not limited to the telephone call as described in the embodiment but may be another wireless communication such as a data communication.

The invention claimed is:

1. A wireless mobile station comprising:
   a controller that acquires in a first wireless cell an adjacent cell list through a wireless interface, the first wireless cell being a communication area of a wireless base station, a wireless link having been established between the wireless base station and the wireless mobile station, the adjacent cell list defining a second wireless cell adjacent to the first wireless cell;
   a first processor that searches wireless base stations for wireless cells detectable in the first wireless cell through the wireless interface, determines a third wireless cell which is not included in the acquired adjacent cell list among the wireless cell shaving been detected by the first processor, measures a wireless quality sensed by the wireless mobile station from the determined third wireless cell and stores the measured wireless quality in a storage device of the wireless mobile station; and
   a second processor that estimates, based on the measured wireless quality stored in the storage device, a wireless quality sensed by the wireless mobile station on assumption that the third wireless cell is added to the adjacent cell list, and determines whether or not the third wireless cell is to be added to the adjacent cell list, on the basis of the estimated wireless quality and a lowest wireless quality obtained without addition of the third wireless cell,
   wherein the second processor determines to add the third wireless cell to the adjacent cell list if a wireless quality at a point of disconnection of a communication in the first wireless cell is estimated to be higher than a wireless quality of the third wireless cell at the equivalent point.

2. The wireless mobile station according to claim 1, wherein the wireless quality is one of or both of a desired wave received power and a ratio of energy per chip to background noise power spectrum density (Ec/N0) on a common pilot channel.

3. A wireless system comprising: the wireless mobile station according to claim 1, and a wireless base station control device transmitting the adjacent cell list to the wireless mobile station.

4. The wireless mobile station according to claim 1,
wherein the first processor searches the wireless cells detectable in the first wireless cell by implementing a three-stage cell search.

5. A wireless base station control device comprising:
a transmitter that notifies a wireless mobile station of an adjacent cell list through an interface, a wireless link having been established between the wireless mobile station and a wireless base station, the adjacent cell list defining a second wireless cell adjacent to a first wireless cell which is a communication area of the wireless base station;
a receiver that receives information on a wireless quality, from the wireless mobile station through an interface, measured by the wireless mobile station about a third wireless cell which is not included in the adjacent cell list, and stores the information in a storage device; and
a processor that estimates, based on the received information stored in the storage device, a wireless quality sensed by the wireless mobile station on assumption that the third wireless cell is added to the adjacent cell list, and determining whether or not the third wireless cell is to be added to the adjacent cell list, on the basis of the estimated wireless quality and a lowest wireless quality obtained without addition of the third wireless cell,
wherein the receiver further receives information on wireless qualities measured by the wireless mobile station about the first wireless cell and the second wireless cell, and
the processor determines to add the third wireless cell to the adjacent cell list if a wireless quality at a point of switching from the first wireless cell to the third wireless cell is estimated to be higher than a wireless quality at a point of switching from the first wireless cell to the second wireless cell.

6. The wireless base station control device according to claim 5,
wherein the receiver receives information on one of or both of a desired wave received power and a ratio of energy per chip to background noise power spectrum density (Ec/N0) on a common pilot channel as the information on the wireless quality from the wireless mobile station.

7. A wireless cell management method implemented by a wireless mobile station, comprising steps of:
acquiring an adjacent cell list, in a first wireless cell which is a communication area of a wireless base station established a wireless link with the wireless mobile station, defining a second wireless cell adjacent to the first wireless cell;
searching wireless cells which is detectable in the first wireless cell, determining a third wireless cell which is not included in the adjacent cell list among the wireless cells detected by the search, and measuring a wireless quality sensed by the wireless mobile station from the determined third wireless cell; and
estimating, based on the measured wireless quality, a wireless quality sensed by the wireless mobile station on assumption that the third wireless cell is added to the adjacent cell list, and determining whether or not the third wireless cell is to be added to the adjacent cell list, on the basis of the estimated wireless quality and a lowest wireless quality obtained without addition of the third wireless cell,
wherein the wireless mobile station determines to add the third wireless cell to the adjacent cell list if a wireless quality at a point of disconnection of a communication in the first wireless cell is estimated to be higher than a wireless quality of the third wireless cell at the equivalent point.

8. The wireless cell management method according to claim 7,
wherein the wireless quality is one of or both of a desired wave received power and a ratio of energy per chip to background noise power spectrum density (Ec/N0) on a common pilot channel.

9. The wireless cell management method according to claim 7,
wherein the wireless mobile station searches the wireless cells detectable in the first wireless cell by implementing a three-stage cell search.

\* \* \* \* \*